United States Patent [19]

Kikuchi

[11] Patent Number: 5,230,027
[45] Date of Patent: Jul. 20, 1993

[54] IMAGE PROCESSOR AND AUTOMATED OPTICAL INSPECTION SYSTEM USING THE SAME

[75] Inventor: Hideo Kikuchi, Tokyo, Japan

[73] Assignee: NEC Corporation, Tokyo, Japan

[21] Appl. No.: 755,005

[22] Filed: Sep. 5, 1991

[30] Foreign Application Priority Data

Sep. 5, 1990 [JP] Japan .................................. 2-235234

[51] Int. Cl.$^5$ .............................................. G06K 9/00
[52] U.S. Cl. ..................................... 382/8; 358/106; 382/41; 382/49
[58] Field of Search ................... 382/8, 27, 30, 34, 41, 382/49, 55; 358/101, 106, 107

[56] References Cited

U.S. PATENT DOCUMENTS

| | | | |
|---|---|---|---|
| 4,167,728 | 9/1979 | Sternberg | 382/45 |
| 4,174,514 | 11/1979 | Sternberg | 382/49 |
| 4,414,685 | 11/1983 | Sternberg | 382/49 |
| 4,477,926 | 10/1984 | Linger et al. | 382/8 |
| 4,510,616 | 4/1985 | Lougheed et al. | 382/8 |
| 4,541,114 | 9/1985 | Rutenbar et al. | 382/49 |
| 4,893,346 | 1/1990 | Bishop | 382/8 |

Primary Examiner—Joseph Mancuso

[57] ABSTRACT

An image processor includes an image memory circuit for storing an inputted image data, and an image processing circuit for processing the image data stored in the image memory circuit. The image processing circuit includes a plurality of image processing circuits each for performing a predetermined processing different from each other. An image distributing circuit controls connection between the plurality of image processing circuits and the image memory circuit.

12 Claims, 13 Drawing Sheets

IMAGE PROCESSOR AND AUTOMATED OPTICAL INSPECTION SYSTEM USING THE SAME

BACKGROUND OF THE INVENTION

1. Field of the Invention

The present invention relates to an image processor and an automated optical inspection system using the same, and more specifically to an automated optical inspection system for inspecting an appearance of a printed circuit board and the like, and an image processor used in the automated optical inspection system.

2. Description of Related Art

An image processor used in a conventional automated optical inspection system for inspecting an appearance of a printed circuit board and the like, includes an image memory circuit and an image processing circuit, for the purpose of inspecting a pin hole, an island, a projection, a partial dent, a breaking (disconnection), a bridge, a wire width thinning, a wire width thickening, a space reduction, etc. (as shown in FIG. 1A).

A first example of the conventional automated optical inspection system includes an image input device for sensing an image of an object to be inspected, and a feature recognition circuit for detecting a feature of a pattern such as a conductor pattern from the image data supplied from the image input device and for detecting a difference between the detected feature and a reference feature.

A second example of the conventional automated optical inspection system includes an image input device for sensing an image of an object to be inspected, an image memory circuit for storing an image data outputted from the image input device, and a central control circuit controlled by a control memory circuit for reading the image stored in the image memory circuit, one pixel by one pixel, and for scanning the read-out image in accordance with a predetermined procedure so as to find out any defect if it exists.

A third example of the conventional automated optical inspection system is such that a reference printed circuit board is sensed by an image input device, and a feature of the image of the reference printed circuit board is extracted by a feature recognition circuit and stored in a feature point image memory circuit. A printed circuit board to be inspected is sensed by the image input device, and a feature of the image of the printed circuit board to be inspected is extracted by the feature recognition circuit and compared in a feature comparing circuit with the feature of the image of the reference printed circuit board stored in the feature point image memory circuit, so that a defect is found if it exists.

A fourth example of the conventional automated optical inspection system includes an image input device, an image memory circuit, a central control circuit, a control memory circuit and an image processing circuit. The central control circuit is controlled by the control memory circuit for controlling to cause the image processing circuit to read the image data stored in the image memory circuit, to conduct a thinning and thickening and other necessary processing of the image and to write the result of the processing to the image memory circuit.

The above mentioned first and third examples of the conventional automated optical inspection system are advantageous since these examples can continuously process the images at a high speed. However, since a method of extracting the feature of the image is fixed to a simple way by a custom circuit for feature recognition, a correct shape very similar to a defect, for example, a space reduction at a contact between a land and a wiring conductor, has been often mistaken for a detect.

The second example of the conventional automated optical inspection system needs a long processing time for scanning the image, since the central control circuit reads out a control procedure from the control memory circuit at each time one pixel of the image is read out, and then generates a read address on the basis of the read-out control procedure.

The fourth example of the conventional automated optical inspection system also needs a long time for detecting a defect by the image processing, since only one image processing circuit is put into an operating condition at a time although many image processing circuits are provided.

SUMMARY OF THE INVENTION

Accordingly, it is an object of the present invention to provide an image processor which has overcome the above mentioned defect of the conventional ones.

Another object of the present invention is to provide an image processor capable of strictly detecting a defect with a shortened image processing time, and an automated optical inspection system using the image processor.

The above and other objects of the present invention are achieved in accordance with the present invention by an image processor including an image memory circuit for storing an inputted image data, an image processing circuit for processing the image data stored in the image memory circuit, the image processing circuit including a plurality of image processing circuits each for performing a predetermined processing different from each other, and an image distributing circuit having means for controlling connection between the plurality of image processing circuits and the image memory circuit.

In a preferred embodiment, the plurality of image processing circuits are constituted of at least two circuits selected from the group consisting of a pattern width measuring circuit for measuring a pattern width and a space between adjacent patterns, a thinning/thickening processing circuit for thinning or thickening the width of a pattern, a thinning processing circuit for thinning a pattern into a predetermined thinned constant width, a feature recognition circuit for detecting a position of a featured point of an image, an image synthesis circuit for synthesizing an image, and an image reduction circuit for reducing an image in size.

In addition, the image processor can further include a featured point memory circuit for storing the featured point of the image detected by the feature recognition circuit.

According to another aspect of the present invention, there is provided an automated optical inspection system comprising an image input means for optically sensing an image of an object to be inspected so as to generate an image data, and an image processor including an image memory circuit receiving the image data outputted from the image input means for storing a received image data, an image processing circuit for processing the image data stored in the image memory circuit, the image processing circuit including a plurality of image processing circuits each for performing a predetermined processing different from each other, and an image distributing circuit having means for controlling connection between the plurality of image processing circuits and the image memory circuit.

In this case, wherein the plurality of image processing circuits can be constituted of at least two circuits selected from the group consisting of a pattern width measuring circuit for measuring a pattern width and a space between adjacent patterns, a thinning/thickening processing circuit for thinning or thickening the width of a pattern, a thinning processing circuit for thinning a pattern into a predetermined thinned constant width, a feature recognition circuit for detecting a position of a featured point of an image, an image synthesis circuit for synthesizing an image, and an image reduction circuit for reducing an image in size, and further including a featured point memory circuit for storing the featured point of the image detected by the feature recognition circuit.

According to still another aspect of the present invention, there is provided an automated optical inspection system comprising an image data preparation means for preparing and outputting an image data of an object to be inspected, and an image processor including an image memory circuit receiving the image data outputted from the image data preparation means for storing a received image data, an image processing circuit for processing the image data stored in the image memory circuit, the image processing circuit including a plurality of image processing circuits each for performing a predetermined processing different from each other, and an image distributing circuit having means for controlling connection between the plurality of image processing circuits and the image memory circuit.

This automated optical inspection system can further include an image input means for optically sensing an image of an object to be inspected so as to generate an image data, and the image memory circuit receives the image data outputted from the image input means for storing a received image data.

With the above mentioned arrangement, the image processing circuit includes the pattern width measuring circuit, the thinning/thickening processing circuit, the thinning processing circuit, the feature recognition circuit, the image synthesis circuit, and the image reduction circuit, which are selectively and arbitrarily coupled to the image memory circuit by the image distributing circuit. Therefore, it is possible to conduct an elaborate defect discrimination, and to increase the processing speed.

In addition, if the image processor includes the feature point image memory circuit, the feature point data stored in the feature point image memory circuit can be compared with a feature point data sensed or read out and processed later, in order to further elevate the precision of the defect detection.

Furthermore, combination of the above mentioned image processor with the image input means and/or the image preparation means can provide a desired automated optical inspection system.

The above and other objects, features and advantages of the present invention will be apparent from the following description of preferred embodiments of the invention with reference to the accompanying drawings.

DESCRIPTION OF THE PREFERRED EMBODIMENTS

Figure 1A:
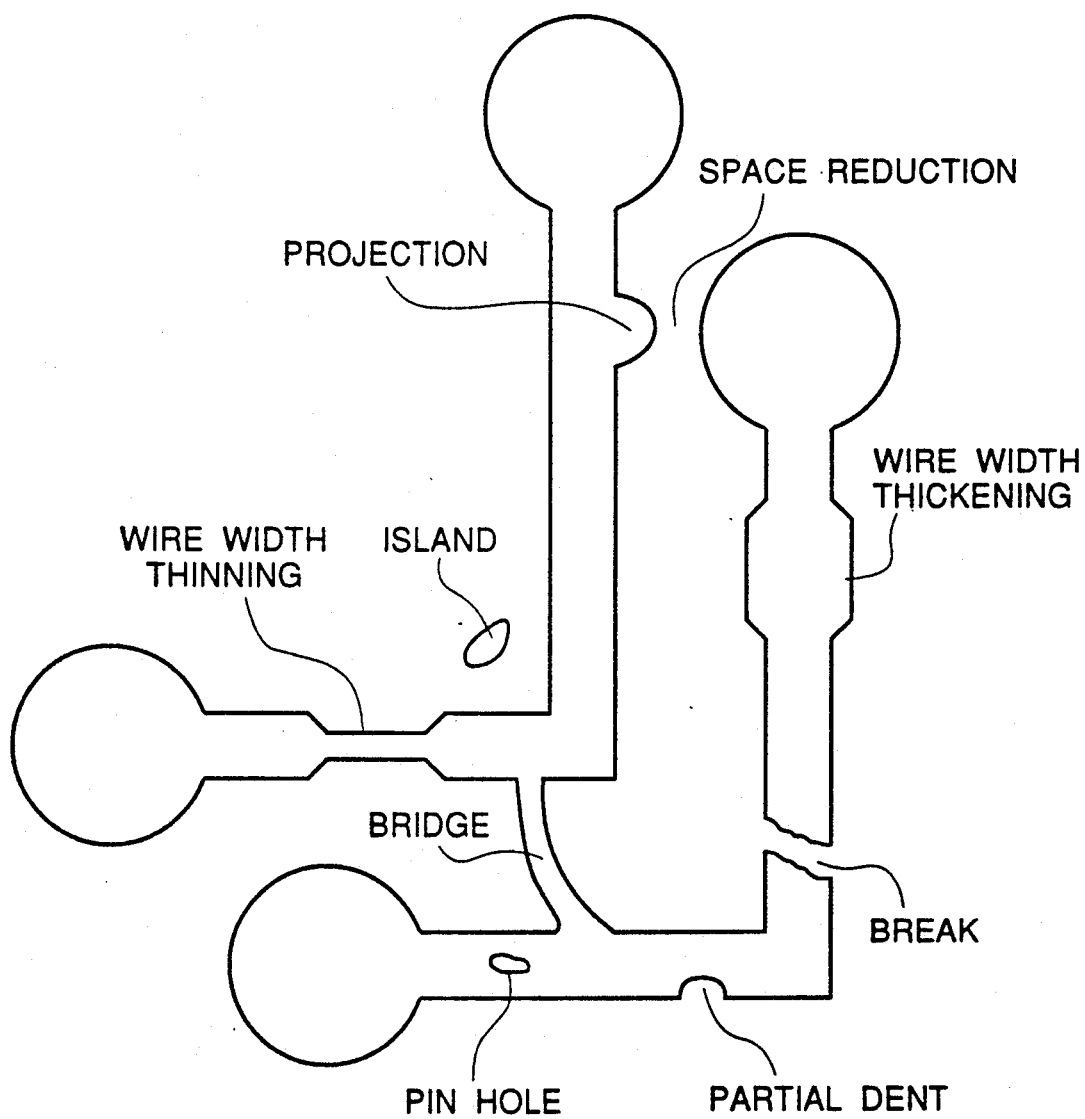
FIG. 1A illustrate various types of defect to be inspected by an automated optical inspection.
Figure 1B:
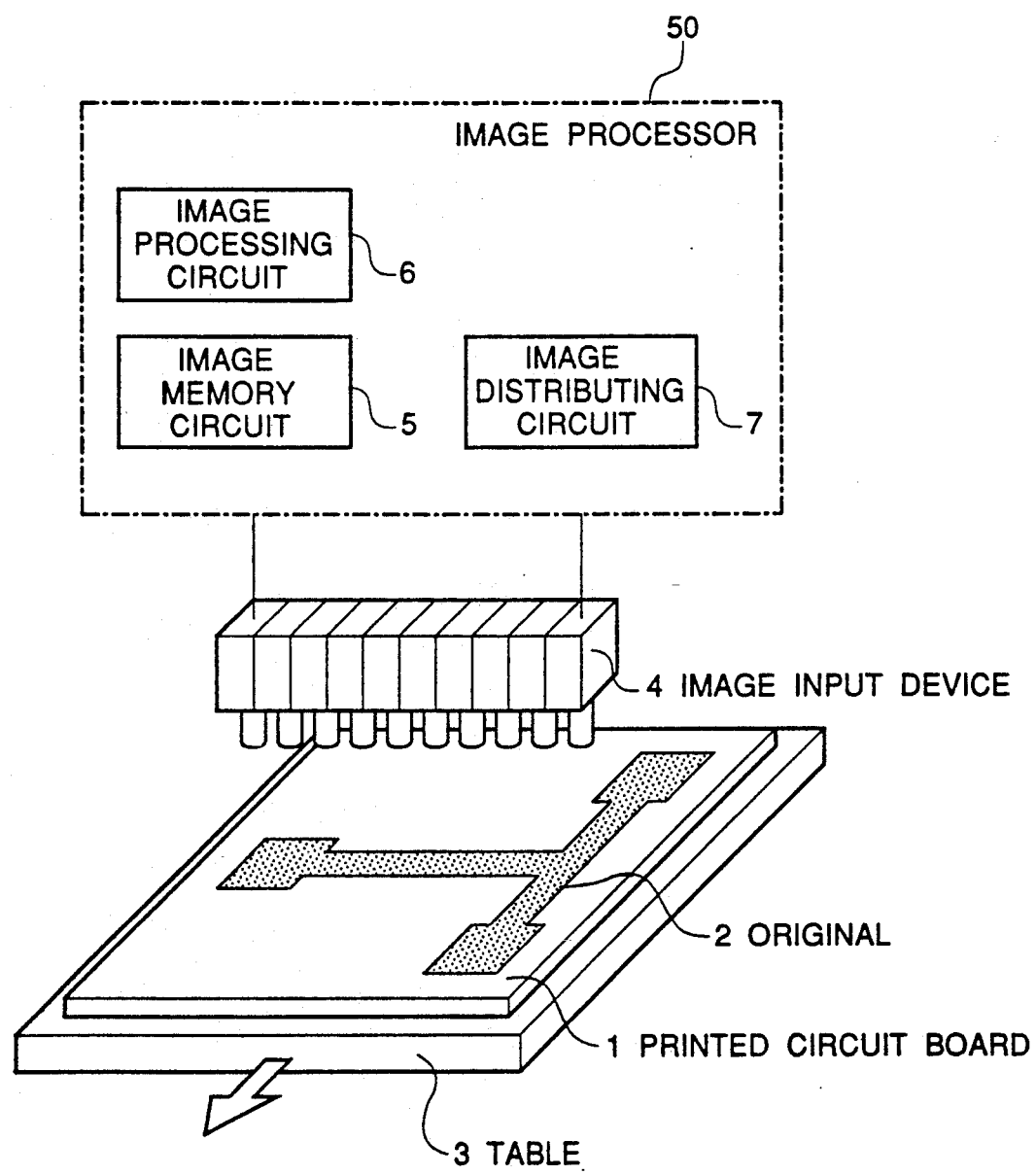
FIG. 1B is a block diagram showing an essential part of a first embodiment of the automated optical inspection system in accordance with the present invention.

Referring to FIG. 1B, there is shown a block diagram showing an essential part of a first embodiment of the automated optical inspection system in accordance with the present invention.

The shown automated optical inspection system includes a movable table 3 on which a printed circuit board 1 or an original picture 2 is located, and an image input device 4 such as a CCD camera or a laser scanner for sensing or detecting a conductor pattern of the printed circuit board 1 or the original picture 2. The image input device 4 is coupled to an image processor 50 including an image memory circuit 5 for storing the sensed or detected image, a plurality of image processing circuits 6 (only one shown for simplification of drawing in FIG. 1B), and an image distributing circuit 7 for controlling to cause these image processing circuits to operate in parallel.

Figure 2:
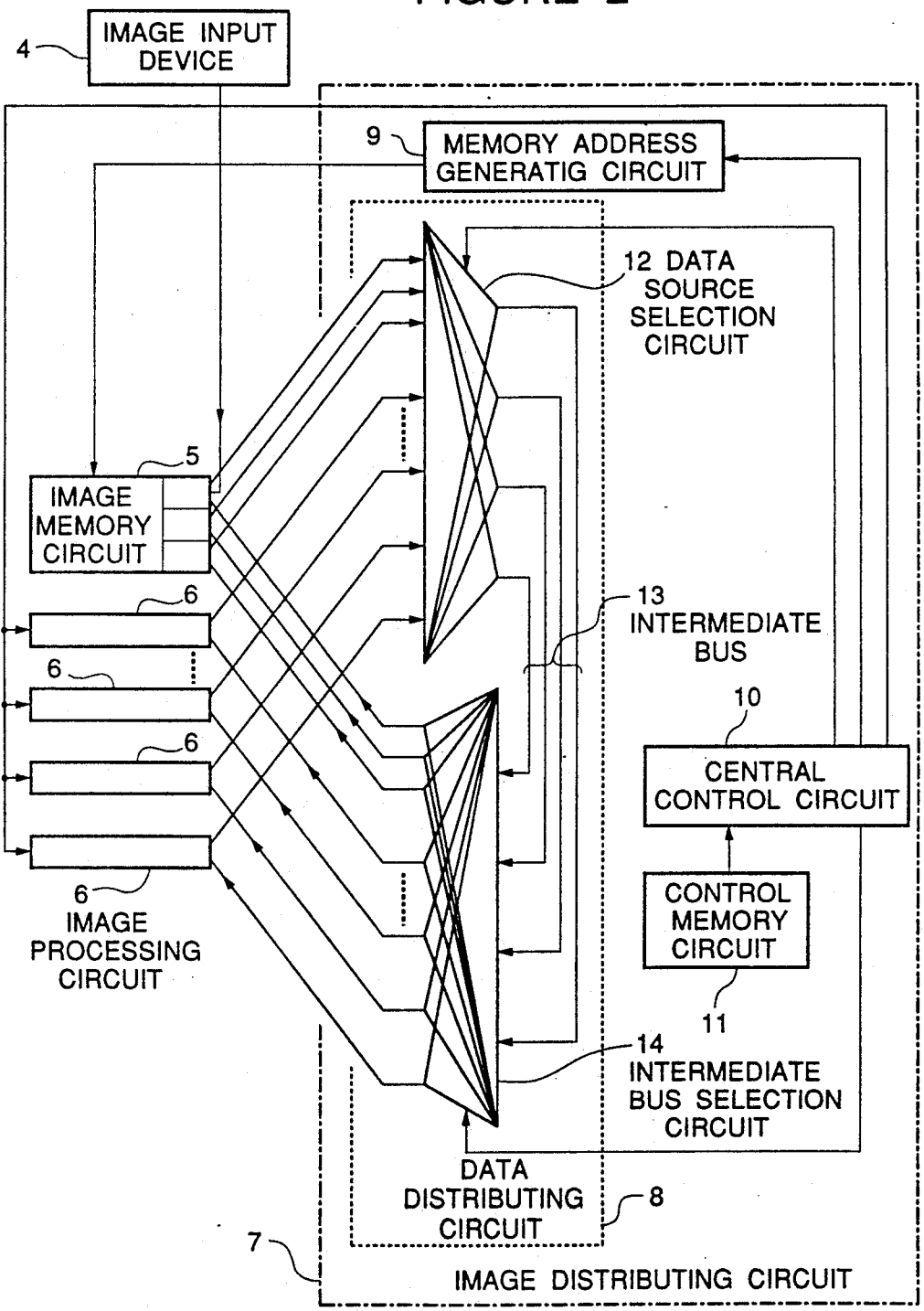
FIG. 2 is a block diagram of the image processor used in the automated optical inspection system shown in FIG. 1A.

Referring to FIG. 2, there is shown a detailed block diagram of the image processor 50 used in the automated optical inspection system shown in FIG. 1B.

The image distributing circuit 7 includes a data distributing circuit 8 for selecting one or more of the plurality of image processing circuits 6 and for supplying the image data to the selected image processing circuits 6, a memory address generating circuit 9 for generating a read address and a write address of the image memory circuit 5 used for reading out or writing the image data, a central control circuit 10 for setting and controlling the operation of these circuits, and a control memory circuit 11 for storing and supplying a control procedure for the central control circuit 10.

The data distributing circuit 8 includes a data source selection circuit 12 composed of a plurality of data source selectors each of which has inputs connected in parallel to data output terminals of the image memory circuit 5 and the image processing circuits 6, and also has an output connected to a corresponding one of a plurality of intermediate buses 13. Each data source selector selects one of the image memory circuit 5 and the image processing circuits 6 so as to connect the output terminal(s) of the selected one of the image memory circuit 5 and the image processing circuits 6 to the corresponding one of the intermediate buses 13. In addition, when the image data is supplied to the intermediate buses 13, the data source selector can either supply the received image data without modification or invert the received image data.

Furthermore, the data distributing circuit 8 also includes an intermediate bus selection circuit 14 having a plurality of intermediate bus selectors each of which has inputs connected in parallel to intermediate buses 13 and also has an output connected to data input terminals of a corresponding one of the image memory circuit 5 and the image processing circuits 6. Each intermediate bus selector 14 operates to select one of the intermediate buses 13 and to connect the selected intermediate bus to the data input terminals of the corresponding one of the image memory circuit 5 and the image processing circuits 6. However, the intermediate bus selector has an operation mode in which none of the intermediate buses 13 is connected to the corresponding one of the image memory circuit 5 and the image processing circuits 6.

Here, assuming that the number of the intermediate buses 13 in N, the data distributing circuit 8 can make it possible to execute a pipelined processing, by connecting (N−1) image processing circuits 6 in cascade so that a final result of the serial image processing of the image data is supplied to the image memory circuit 5.

The data source selection circuit 12 and the intermediate bus selection circuit 14 are controlled by the central control circuit 10 through a data bus.

Figure 3:
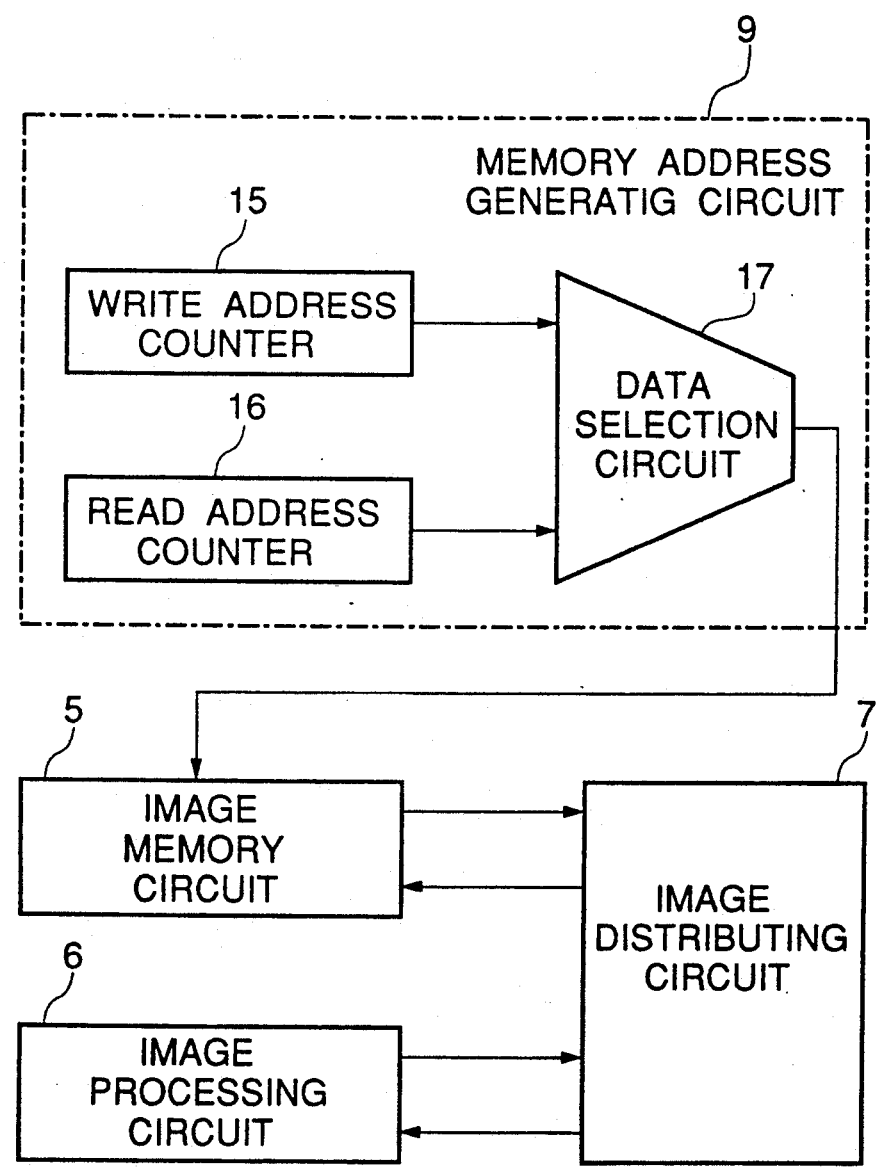
FIG. 3 is a block diagram of the memory address generating circuit used in the image processor shown in FIG. 2.

Referring to FIG. 3, there is shown a block diagram of the memory address generating circuit 9. The memory address generating circuit 9 includes a write address counter 15 and a read address counter 16. Outputs of the write address counter 15 and the read address counter 16 are connected to inputs of a data selection circuit 17, which has an output connected to an address input terminal of the image memory circuit 5. With this arrangement, the write address and the read address are alternately switched as the memory address of the image memory circuit 5, so that the image memory circuit 5 is alternately read out and written. At each time of the read/write, the memory address is incremented, so that data of one pixel is transferred between the image processing circuits 6 and the image memory circuit 5 and the data distributing circuit 7.

Turning to FIG. 2, the central control circuit 10 reads the control procedure stored in the control memory circuit 11 and operates in accordance with the read-out procedure. In addition, the central control circuit 10 sets the operation condition to the data source selection circuit 12 and the intermediate bus selection circuit 14 through the data bus. The central control circuit 10 also sets the read memory address and the write memory address to the memory address generating circuit 9, and instructs the memory address generating circuit 9 to start its operation. Furthermore, the central control circuit 10 sets various parameters required by the image processing circuit 6.

Figure 4:
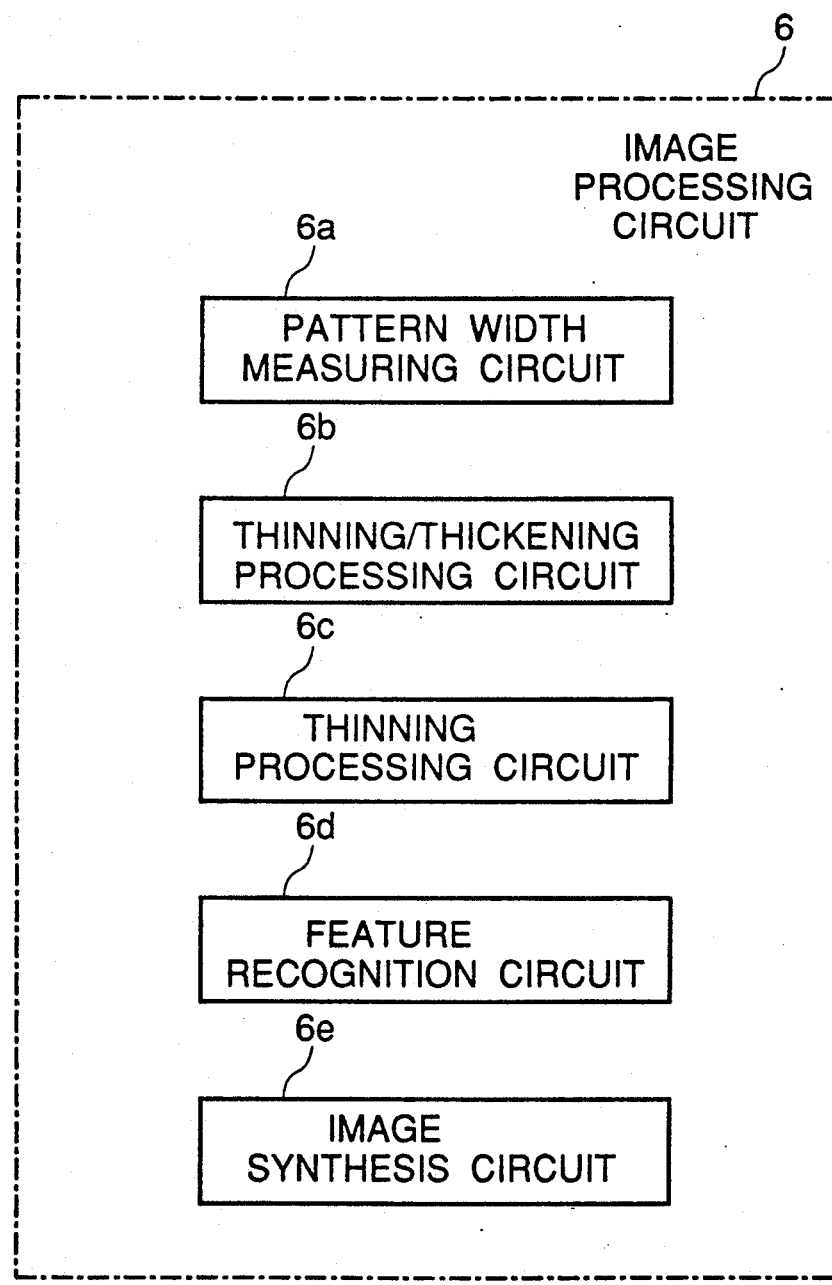
FIG. 4 is a block diagram of the image processing circuits used in the image processor shown in FIG. 2.

As illustrated in FIG. 4, the image processing circuit 6 includes a pattern width measuring circuit 6a, a thinning/thickening processing circuit 6b, a thinning processing circuit 6c, a feature recognition circuit 6d and an image synthesis circuit 6e, which can respectively execute an elementary operation for recognition of defect. Each of the circuits 6a to 6e includes an image processing circuit of a table look-up type which executes a table look-up processing of an image within a window of $3 \times 3$.

Figure 5:
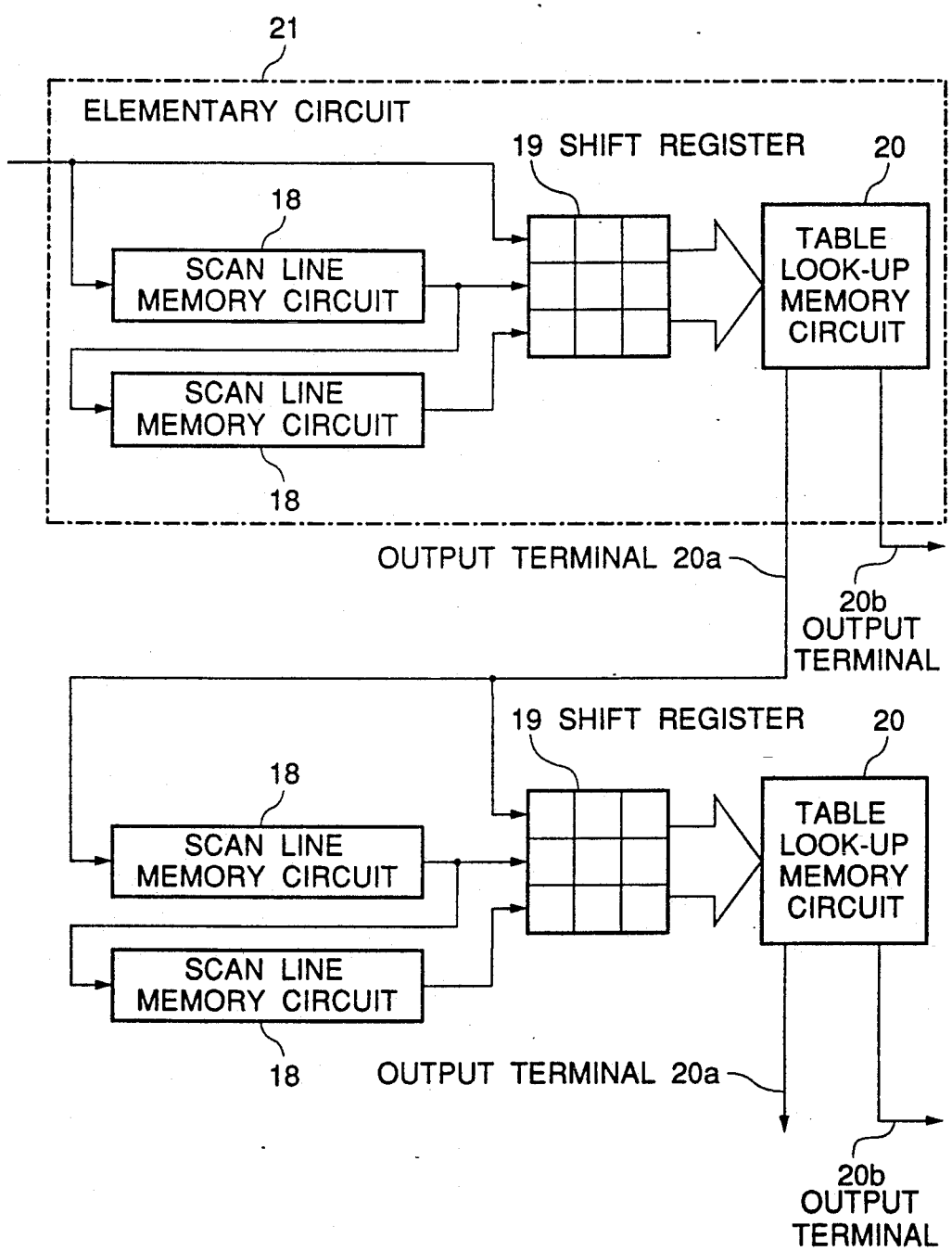
FIG. 5 is a block diagram of the table look-up processing circuit used in the image processing circuit shown in FIG. 4.

Referring to FIG. 5, there is shown a block diagram of the table look-up processing circuit. The shown table look-up processing circuit includes a plurality of elementary circuits 21. For the purpose of ensuring that the table look-up processing is automatically executed in synchronism with an image data fetching, each of the elementary circuits 21 includes two one-scan-line memory circuits 18 for storing an image data of the amount corresponding to two scan lines in total. One of the two one-scan-line memory circuits 18 serially receives the image data supplied to the elementary circuit 21, and the other one-scan-line memory circuit serially receives an output of the one of the two one-scan-line memory circuits 18. Each of the elementary circuits 21 also includes three 3-bit shift registers 19 respectively receiving and shifting the image data supplied to the elementary circuit 21 and an output of each of two one-scan-line memory circuits 18, and a table look-up memory circuit 20 having address terminals respectively connected to outputs of the three 3-bit shift registers 19. This table look-up memory circuit 20 has two output terminals 20a and 20b. The output terminal 20a supplies a result of the modification of image such as the thinning of image, and the output terminal 20b supplies a result of the feature extraction of image.

Therefore, the image processor 6 is constituted of a plurality of elementary circuits 21 coupled in cascade in such a manner that the result of image modification output from one elementary circuit is supplied to an input of a next elementary circuit, so that respective image processing stages of a multi-stage image processing are executed in parallel.

The table look-up processing can be modified or changed by changing a content of the table look-up memory circuit 20. Therefore, as will be explained hereinafter, various image processings such as the thinning of image, an end point extraction of image, etc. can be executed.

Figure 6:
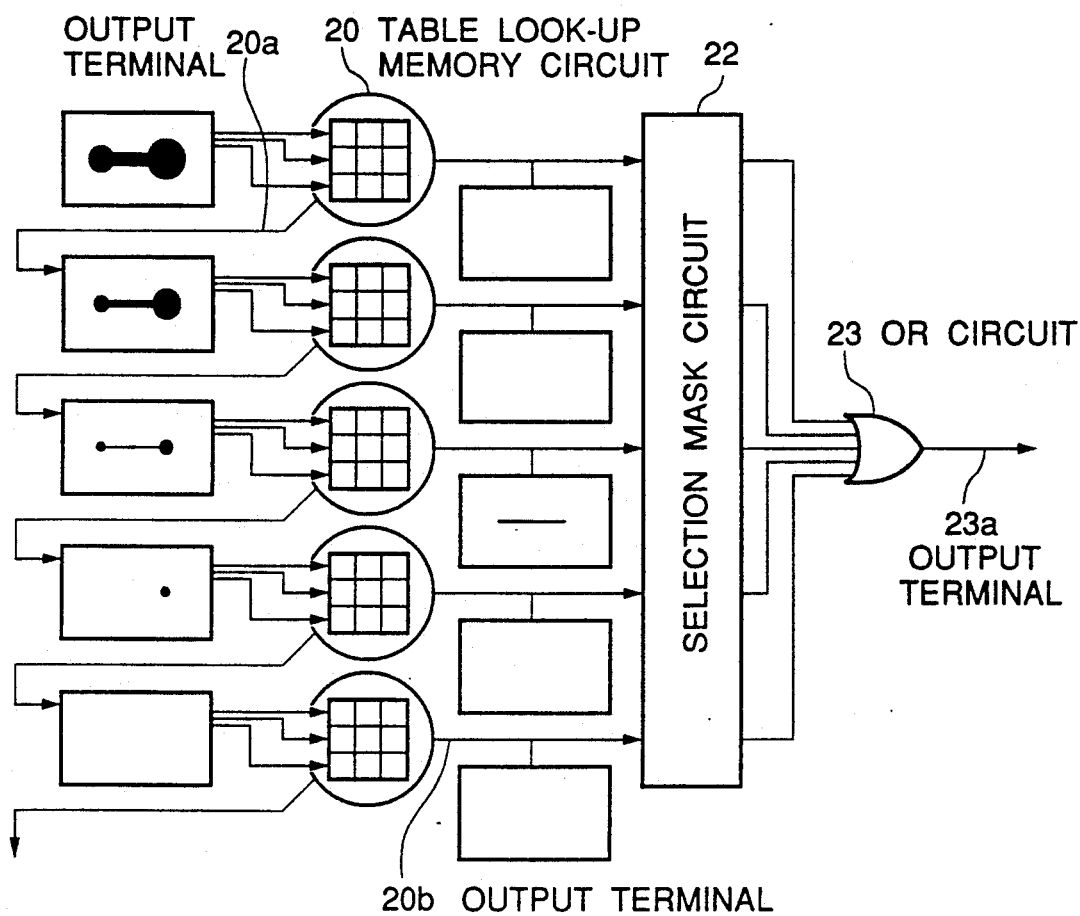
FIG. 6 is a block diagram of the pattern width measuring circuit used in the image propelling circuit shown in FIG. 4.

Referring to FIG. 6, there is shown a block diagram of the pattern width measuring circuit 6a for measuring the width of a pattern and a space between each pair of (line-shaped) patterns.

The pattern width measuring circuit 6a is configured so that each of elementary circuits coupled in cascade operates to thin or narrow the received pattern by one pixel by action of the table look-up processing, so as to discriminate in the thinned pattern a line pattern having the width of one pixel (called a "string") by the feature extraction processing. The number of the pattern thinning processings, in which the string has been found, indicates the width of a given pattern. Therefore, the output terminals 20b (indicative of the result of the feature extraction processing) of all the elementary circuits 21 are connected to an OR circuit 23 through a selection mask circuit 22 which operates to mask received outputs in an extent corresponding to an allowable pattern width. Therefore, if the OR gate 23 outputs an active signal to an output terminal 23a, it means that the given pattern is defective in the pattern width. A mask parameter for the selection mask circuit 22 is set by the central control circuit 10.

The thinning/thickening processing circuit 6b performs an arbitrary amount of thinning processing (or thickening processing) of the image. The thinning processing circuit 6c converts the received pattern to a thinned pattern having a predetermined constant width. The feature recognition circuit 6d detects and outputs various features such as a direction, an end point, and a branched point of a wiring conductor, and an isolated point, etc., by the table look-up processing.

Figure 7:
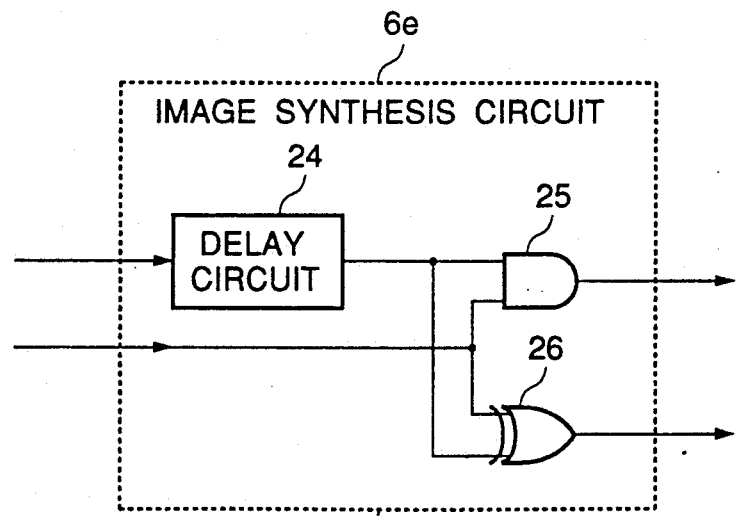
FIG. 7 is a block diagram of the image synthesis circuit used in the image processing circuit shown in FIG. 4.

FIG. 7 shows a block diagram of the image synthesis circuit 6e, which includes two input terminals for receiving two image data. In order to match positions of the two image data to each other, the image synthesis circuit 6e includes a delay circuit 24 receiving one of the two image data for delaying the received image data by a designated number of pixels. The one image data thus delayed by the delay circuit 24 and the other or non-delayed image data are supplied to each of an AND circuit 25 and an OR circuit 26. Here, either or both of the two image data supplied to the image synthesis circuit 6e can be inverted by the data distributing circuit 8, and also, either or both of the two image data outputted from the image synthesis circuit 6e can be inverted by the data distributing circuit 8. Therefore, 16 different logical operations are realized.

As seen from the above, the above mentioned first embodiment is characterized in that the automated optical inspection system includes the image input device 4 and the image processor 50, and the image processor 50 includes the image processing circuit 6 containing five different kinds of circuit 6a to 6e and the image distributing circuit 7.

Figure 8:
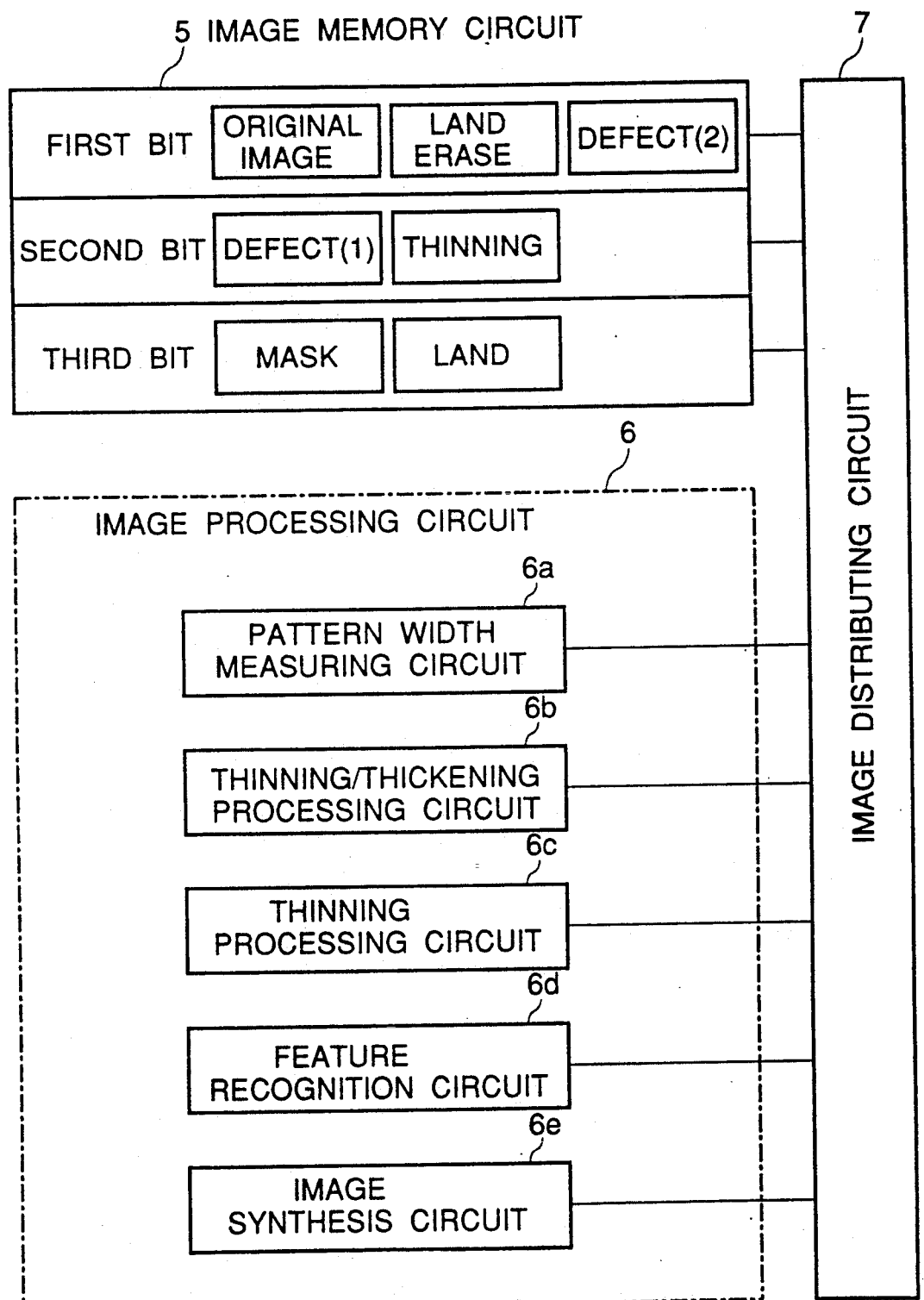
FIG. 8 is a block diagram of an image data in the image processing circuit shown in FIG. 4.

Now, an overall operation of the above mentioned first embodiment will be described with reference to FIG. 8. Here, assume that the image data has been already stored in the image memory circuit 5 as shown in FIG.8.

(1) Detection of defective space

The image distributing circuit 7 controls to the effect that the original image stored in the image memory circuit 5 is read out from a first bit of the image memory circuit 5, and supplied to the pattern width measuring circuit 6a, and the result of processing indicative of the pattern width (or space) defect is sent from the pattern width measuring circuit 6a to a second bit of the image memory circuit 5. Here, an address in which the result of processing is written at the second bit is made different from the address on which the original image is written or stored at the first bit, in order to comply with a later processing for excluding a pseudo-defect.

(2) Elimination of space defect detection in a connecting point between a wiring pattern and a land.

(2-1) Similarly to the processing (1), the original image stored in the image memory circuit 5 is read out from a first bit, and supplied to the thinning/thickening processing circuit 6b, where the received image is thinned by the amount not less than the wiring conductor width, so as to form a land data in which the wiring conductor pattern is completely eased but thinned lands and thinned wide width pattern remains. This land image data is supplied to a third bit of the image memory circuit 5. With this processing, it becomes to distinguish the lands and the like from the wiring pattern.

Here, an address for writing the land image at the third bit is made to correspond to the address on which the original is written or stored at the first bit, in order to comply with a later processing for synthesizing the original image and the land image.

(2-2) The land data, namely the image data of the third bit of the image memory circuit 5 and the original image, namely the image data of the first bit of the image memory circuit 5 are read out simultaneously and supplied to the image synthesis circuit 6e. At this time, the original image is inverted, and the inverted original image is supplied to the image synthesis circuit 6e, and combined with the land data by the AND circuit 25.

As a result, an image in which the land is erased can be synthesized by subtracting the land from the original image. This image is supplied to the image memory circuit 5, and stored at an address different from the address where the original image is stored at the first bit.

(2-3) The synthesized image is supplied to the thinning processing circuit 6c so as to be converted to a thinned pattern having a predetermined constant width. The result of the thinning processing is written in the image memory circuit 5 at an address different from the address in which the pattern width defect data is written at the second bit.

With this processing, there has been obtained a thinned image in which a string is formed by a contour line of the wiring conductor and the land and in which a branch point is formed by a connecting point between the land and the wiring conductor.

(2-4) This thinned image is read out from the second bit of the image memory circuit 5, and fed to the feature recognition circuit 6d so that a branch point is extracted, and a branch point image, in which a position of the branch point is indicated by a dot, is formed. This branch point image is outputted to the intermediate bus 13, and then, inputted to the thinning/thickening processing circuit 6b so that the branch point image is thickened or widened. The image thus obtained is a space discrimination mask image.

The space discrimination mask image is written at an address different from the address in which the pattern width defect data is written at the third bit.

These processings are performed by simultaneously and serially operating the feature recognition circuit 6d and the thinning/thickening processing circuit 6b.

(2-5) The space discrimination mask image is read out from the third bit of the image memory circuit 5, and at the same time, the pattern width defect data is read out from the second bit of the image circuit 5 The space discrimination mask image is inverted, and the inverted space discrimination mask image and the pattern width defect data are supplied to the AND circuit 25 of the image synthesis circuit 6e.

Thus, an image obtained from the AND circuit 25 is a defect discrimination image which does not include the pseudo-defect (mistaking the connecting point between the land and the wiring conductor as the space reduction).

The defect discrimination image is written to an address different from the address in which the existing image is stored at the first bit.

Figure 9:
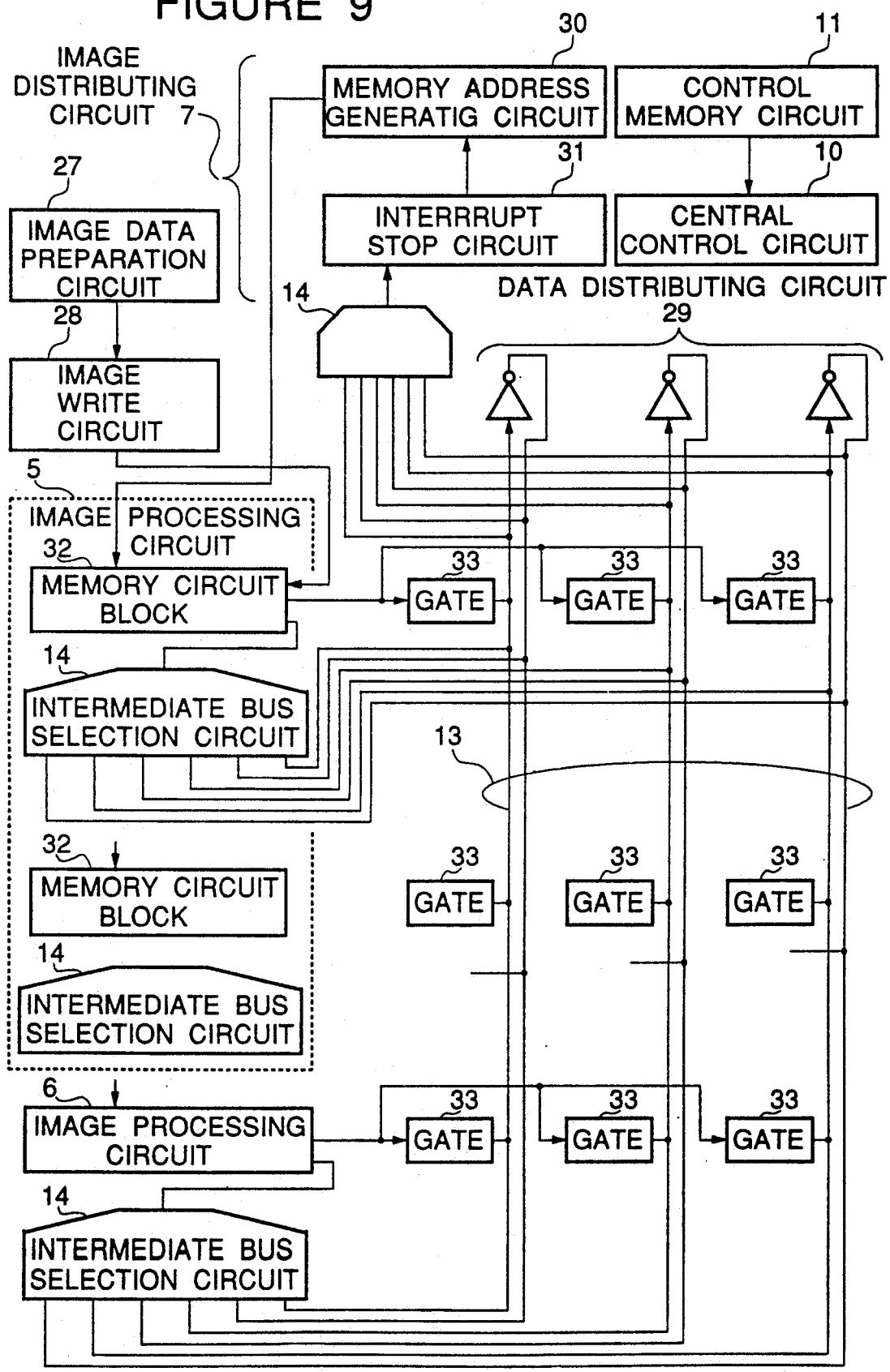
FIG. 9 is a block diagram showing an essential part of a second embodiment of the automated optical inspection system in accordance with the present invention.

Referring to FIG. 9, there is shown a block diagram of an essential part of a second embodiment of the automated optical inspection system in accordance with the present invention.

The second embodiment of the automated optical inspection system includes an image data preparation circuit 27 for preparing and outputting an image data of a print pattern for a printed circuit board, and an image write circuit 28 receiving the image data of the print pattern and writing the received image data of the print into the image memory circuit 5. The image processor includes the image memory circuit 5 including a plurality of memory circuit blocks 32, a plurality of image processing circuits 6, and an image distributing circuit 7 for causing these circuits to operate in parallel.

In addition to the central control 10 and the control memory circuit 11 similar to the embodiment, the image distributing circuit 7 includes a data distributing circuit 29, an address generating circuit 30 and an interrupt stop circuit 31.

The data distributing circuit 29 includes a number of gate circuits 33 for connecting the output terminals of each memory circuit block 32 and each image processing circuit 6 to the intermediate buses 13.

The central control circuit 10 controls to the effect that, for each of the intermediate buses 13, all the gate circuits to be coupled to each intermediate bus 13 are designated by I/O control signals and address bus signals, and one of the designated gate circuits is selected to communicate with one intermediate bus 13 by data bus signals.

The data distributing circuit 29 includes a plurality of intermediate bus selection circuits 14 each of which is provided for the input terminals of a corresponding one of the image processing circuits 6 and the memory circuit blocks 32. The central control circuit 10 sets a data selection register (not shown) of each intermediate bus selection circuit 14 so that one signal terminal of the intermediates bus 13 is connected to the image processing circuit 6 or the like. However, in some case, the image processing circuits 6 and the memory circuit blocks 32 are not connected to the intermediate bus 13. The memory circuit block 32 having its image data input terminal connected to the intermediate bus 13 is also connected to receive the write control signal. The other memory circuit blocks 32 are connected to receive the read control signals.

Figure 10:
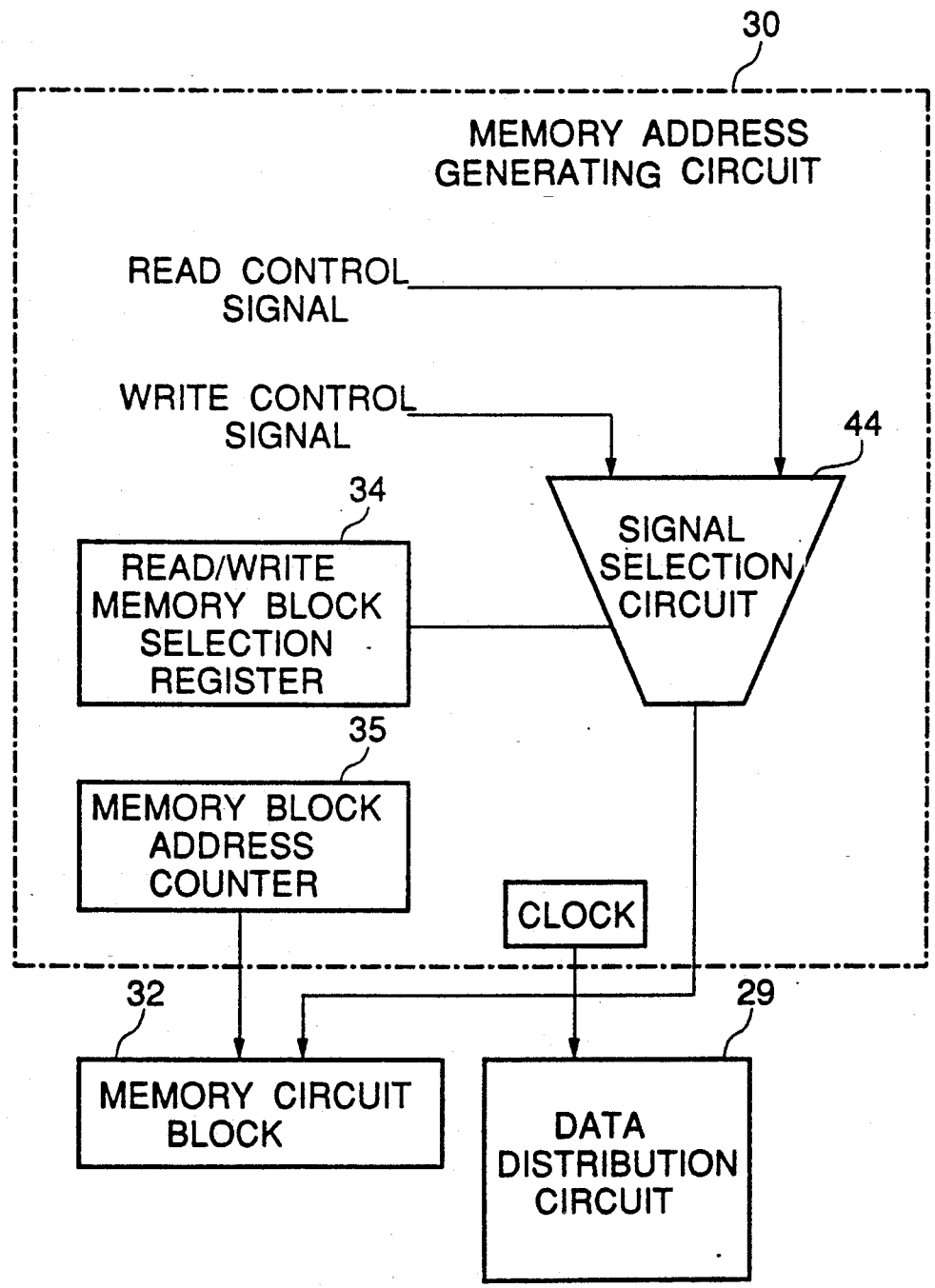
FIG. 10 is a block diagram of the memory address generating circuit used in the automated optical inspection system shown in FIG. 9.

Referring to FIG. 10, the address generating circuit 30 includes a read/write memory block circuit selection register 34, a memory block address counter 35 and a signal selection circuit 44. The address for reading and writing each of the memory circuit blocks 32 is generated by the memory block address counter 35. At each time of read/write, the memory block address counter 35 is incremented so as to increment the address, and the image data of one pixel is transferred between each image processing circuit 6 and the image memory circuit 5 and the data distributing circuit 8.

The image distributing circuit 7 includes the interrupt stop circuit 31, which reads the image data on the intermediate bus 13, and stops the operation of the memory block address counter 35 when the read-out data is "1". The central control circuit 10 sets the memory block address counter 35, and reads the content of the memory block address counter 35.

In the second embodiment, the image processing circuit 6 includes an image reduction circuit 36 in addition to the circuits of the image processing circuit 6 of the first embodiment, in order to enable a defect recognition operation.

Figure 11:
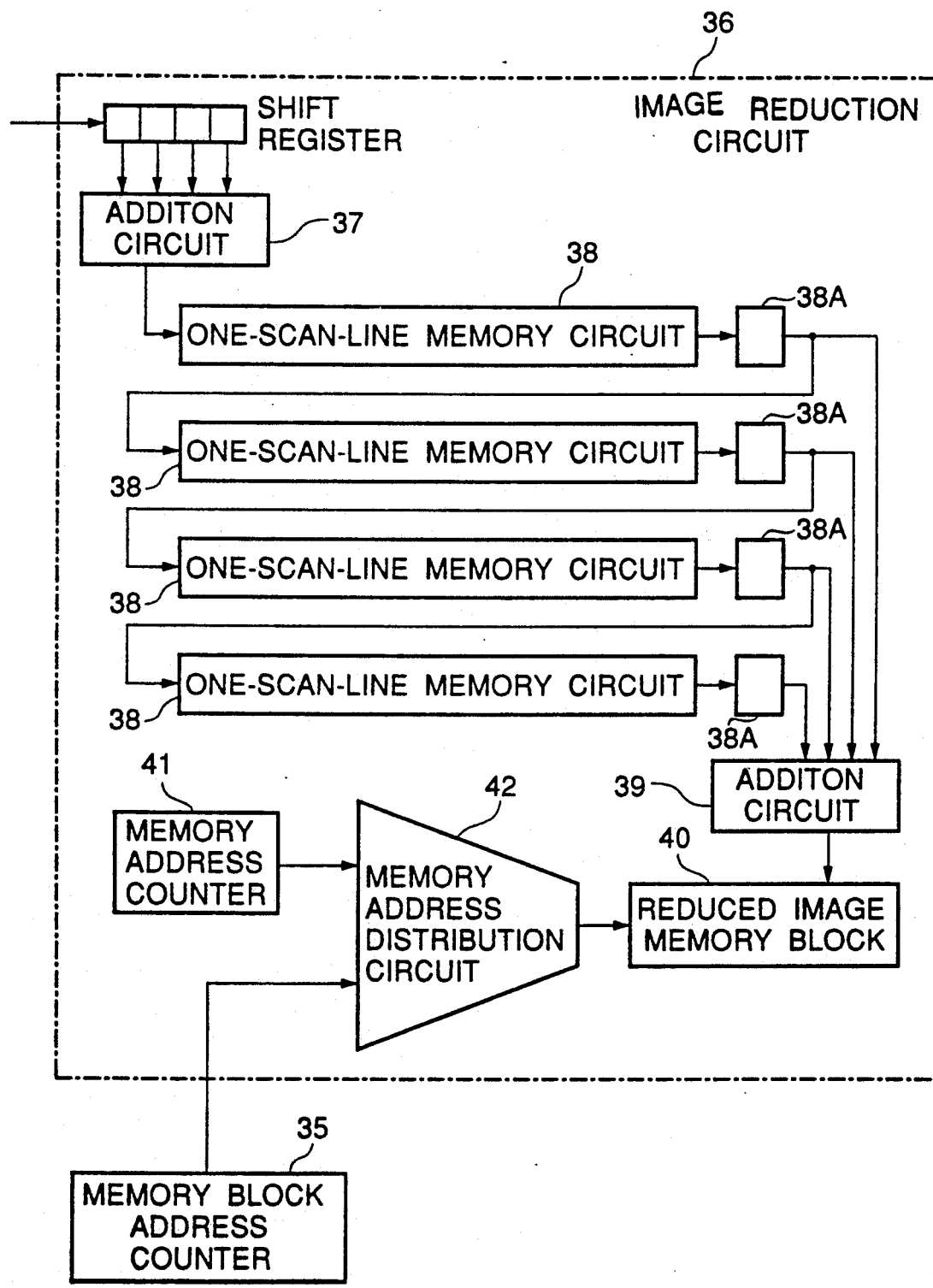
FIG. 11 is a block diagram of the image reduction circuit used in the automated optical inspection system shown in FIG. 9.

Referring to FIG. 11, there is shown a block diagram of the image reduction circuit 36. The image reduction circuit 36 includes a first addition circuit 37 for summing the image data of a reduced number of pixels in a main scanning direction. An output of the first addition circuit 37 is supplied to a one-scan-line memory circuit 38 which is adapted to store the image data of one scan line. In the shown example, four one-scan-line memory circuits 38 are cascaded through buffers 38A. Outputs of the one-scan-line memory circuits 38 are supplied through the buffers 38A to a second addition circuit 39, so that corresponding pixel data items of the four image data respectively stored in the one-scan-line memory circuits 38 are added. An output of the addition circuit 39 is supplied and stored in a reduced image memory block 40. An address for the reduced image memory block 40 written with the data outputted from the addition circuit 39 is generated by setting an initial value to a memory address counter 41 by action of the central control circuit 10 and by incrementing the value of the memory address counter 41 at each time the reduced image memory block 40 is written with data. The content of the memory address counter 41 is supplied to the reduced image memory block 40 through a memory address distributing circuit 42. In order to connect the reduced image memory block 40 to the intermediate bus 13 so as to read out the reduced image memory block 40, the memory address distributing circuit 42 is controlled to supply the output of the memory block address counter 35 of the memory address distributing circuit 42 to the reduced image memory block 40, in place of the content of the memory address counter 41.

The second embodiment of the automated optical inspection system shown in FIG. 9 is characterized in that it comprises the image data preparation circuit 27 including the image write circuit 28 and the image processor including the image reduction circuit 36 in addition to the circuits included in the image processor of the first embodiment.

Now, an overall operation of the second embodiment will be described.

(1) Detection of space defect

The image distributing circuit 7 controls so that the original image is read out from the memory circuit block 32 and supplied to the pattern width measuring circuit 6a. The result of processing executed in the pattern width measuring circuit 6a (the pattern width defect data) is supplied to another memory circuit block 32.

(2) Image data reduction

The original image data and the pattern width defect data are reduced in size by the image reduction circuit 36. If an image data composed of M pixels in each of vertical and horizontal directions is reduced to an image data consisting of one pixel, the pixel number of the received or fetched image data is reduced to $1/M^2$. The image processing circuit 6 can execute the processing $M^2$ times during a period of time in which the image data is fetched. Similarly to the first embodiment, the connection point between the land and the wiring pattern is omitted from the space defect detection processing, by using the reduced image data.

(3) Reading of coordinate of the pattern width defect data

The central control circuit 10 controls to the effect that the patten width defect data is read out from the memory circuit block 32 to the image distributing circuit 7, and when the read-out pattern width defect data includes a defective data of "1", the memory block address counter 35 is stopped by the interrupt stop circuit 31. The address at this time is regarded as a coordinate of the read-out defective data. With this, it is possible to read the coordinate of the read-out defective data at a high speed.

Figure 12:
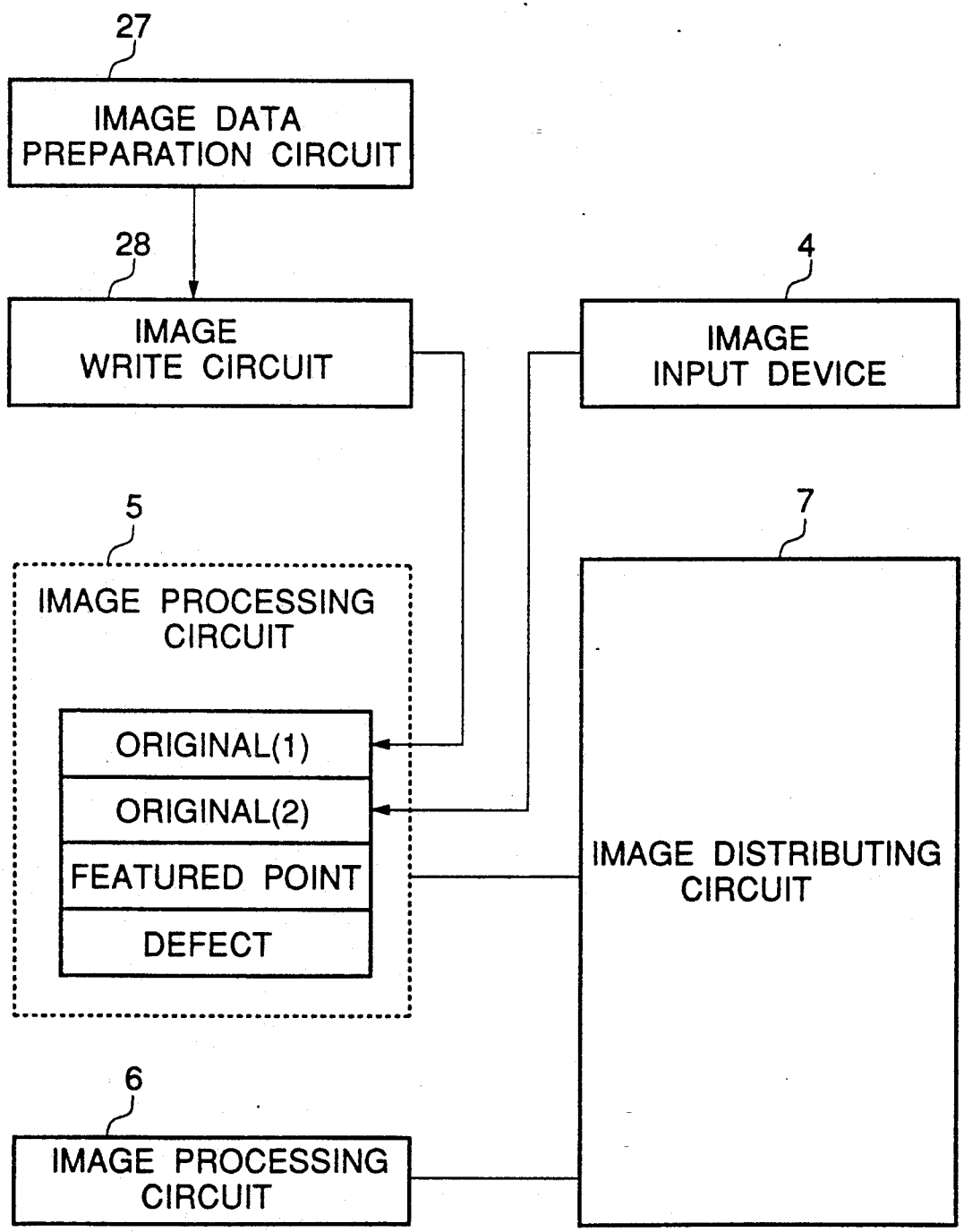
FIG. 12 is a block diagram showing an essential part of a third embodiment of the automated optical inspection system in accordance with the present invention.

Referring to FIG. 12, there is shown a block diagram showing an essential part of a third embodiment of the automated optical inspection system in accordance with the present invention.

The third embodiment of the automated optical inspection system includes an image data preparation circuit 27 for preparing and outputting an image data of a print pattern for a printed circuit board, and an image write circuit 28 receiving the image data of the print pattern and writing the received image data of the print pattern into the image memory circuit 5, the image input device 4 for sensing or detecting an conductor pattern image of the printed circuit board, and for writing the sensed image into image memory circuit 5, and the image processor including the image memory circuit 5, a plurality of image processing circuit 6 and the image distributing circuit 7.

The third embodiment of the automated optical inspection system shown in FIG. 12 is characterized in that it comprises the image input device 4 and the image data preparation circuit 27 including the image write circuit 28, in addition to the circuits included in the image processor of the first embodiment.

Now, an overall operation of the third embodiment will be explained.

(1) Image writing and image inputting

On the basis of the image data written in the image memory circuit 5 by the image write circuit 28, similarly to the first embodiment, a pattern width defect data is obtained from the pattern width measuring circuit 6a, and an image, in which a contour line of the wiring conductor and the land is converted into a string, is generated by cooperation of the thinning/thickening processing circuit 6b, the image synthesis circuit 6e and the thinning processing circuit 6c, and then, processed by the feature recognition circuit 6d so that a feature point image is produced. Similarly, the same processings are executed for the image data supplied from the image input device 4, so that similar image data is produced.

(2) Comparison and cancelation between images

The feature point image data or another prepared on the basis of the image supplied from the image write device 28 is thickened by a few pixels by action of the thinning/thickening processing circuit 6c so as to generate a mask image. In the image synthesis circuit 6e, the mask thus generated is combined with the feature point image data or another prepared on the basis of the image supplied from the image input device 4, so that a coincidence portion is erased. The remaining or resultant image is a first defect image. Similarly, the image data supplied from the image write device 28 is masked by the image data supplied from the image input device 4, so that a second defect image is obtained. All defects can be known by combining the first and second defect images.

Figure 13:
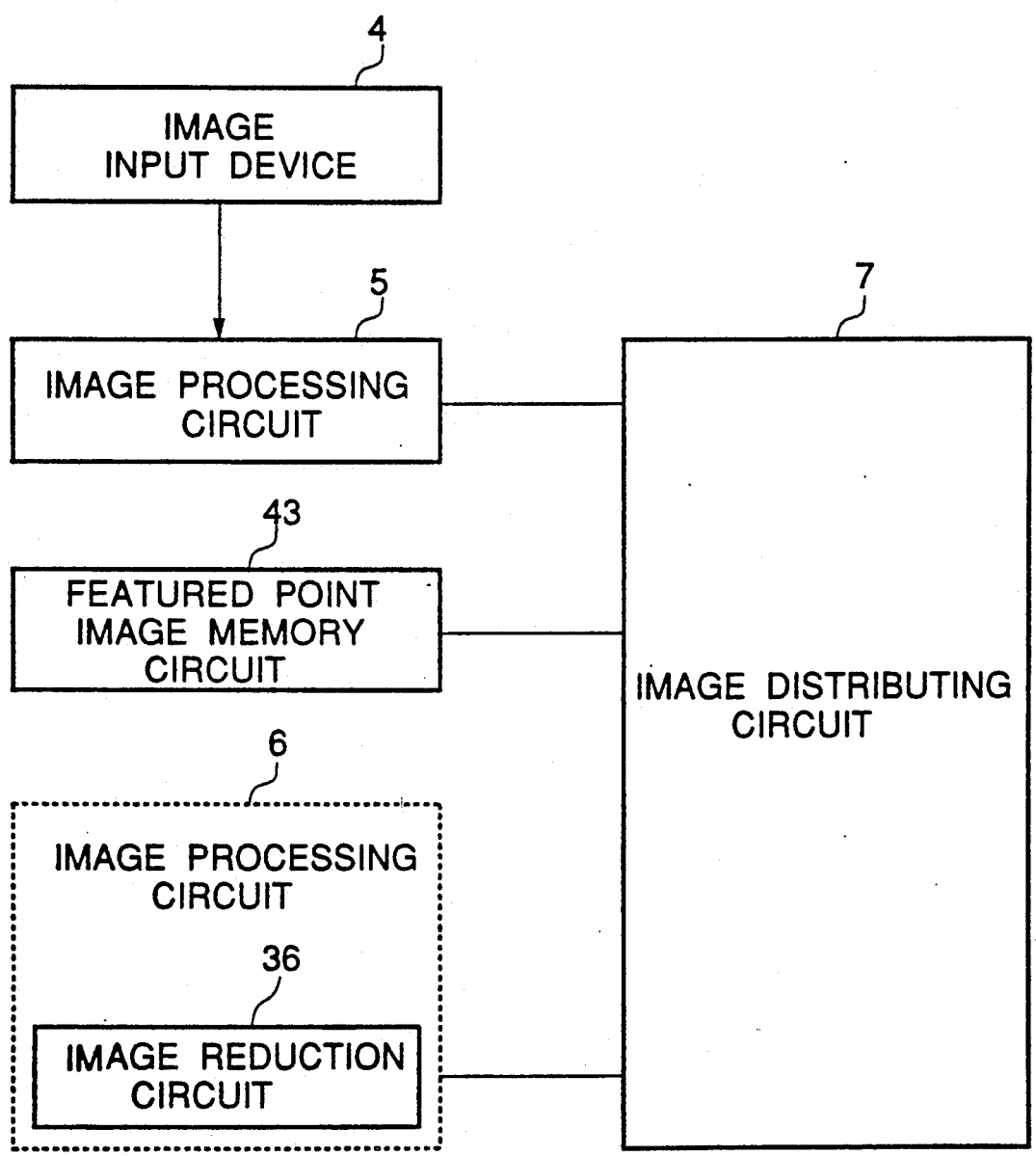
FIG. 13 is a block diagram showing an essential part of a fourth embodiment of the automated optical inspection system in accordance with the present invention.

Referring to FIG. 13, there is shown a block diagram showing an essential part of a fourth embodiment of the automated optical inspection system in accordance with the present invention.

The fourth embodiment of the automated optical inspection system includes the image input device 4, and the image processor including the image memory circuit 5, the image processing circuit 6 including the image reduction circuit 36, the image distributing circuit 7, and a feature point image memory circuit 43.

The fourth embodiment of the automated optical inspection system shown in FIG. 13 is characterized in that it comprises the image input device 4 and the image processor, and the image processor includes the image reduction circuit 36 and the feature point image memory circuit 43 in addition to the circuits included in the image processor of the first embodiment.

Now, an overall operation of the fourth embodiment will be explained.

First, the image data of a first printed circuit board is sensed and read, and similarly to the third embodiment, the feature points of the image data is extracted. The feature point image is reduced in size by the image reduction circuit 36, and the reduced feature point image is stored in the feature point image memory circuit 43.

Then, the image data of a second printed circuit board is sensed and read, and similarly to the third embodiment, the feature points of the image data is extracted. The feature point image is reduced in size by the image reduction circuit 36, and the reduced feature point image of the second printed circuit board thus formed is compared with the reduced feature point image of the first printed circuit board stored in the feature point image memory circuit 43. As a result, a defect image can be obtained.

As seen from the above description, the present invention can modify an image and extract a feature of the image, by action of the image distributing circuit having feasibility of arbitrarily reading and writing a stored image, as well as various image processing circuits. A correct pattern slightly different from a defect pattern can be clearly discriminated as the correct pattern. In addition, since a plurality of image processing circuits can be freely coupled in cascade and can be operated simultaneously, the system having not only feasibility but also a high speed operation can be realized.

The invention has thus been shown and described with reference to the specific embodiments. However, it should be noted that the present invention is in no way limited to the details of the illustrated structures but changes and modifications may be made within the scope of the appended claims.

I claim:

1. An image processor comprising an image memory circuit for sequentially receiving and storing an inputted image data and sequentially outputting stored image data, an image processing circuit means for processing the image data stored in the image memory circuit, the image processing circuit means including a plurality of image processing circuits being formed for respectively performing predetermined processing functions different from each other, and an image distributing circuit including control circuit means for establishing and controlling connections between the plurality of image processing circuits and the image memory circuit for selectively and arbitrarily coupling predetermined image processing circuits to said image memory circuit and causing said image processing circuits to operate and perform different processing functions in parallel so that a flow of data transferred and processed through said image processing circuits can be arbitrarily changed by said control circuit means.

2. An image processor claimed in claim 1 wherein the plurality of image processing circuits are constituted of at least two circuits selected from the group consisting of a pattern width measuring circuit for measuring a pattern width and a space between adjacent patterns, a thinning/thickening processing circuit for thinning or thickening the width of a pattern, a thinning processing circuit for thinning a pattern into a predetermined constant width, a feature recognition circuit for detecting a position of a featured point of an image, an image synthesis circuit for synthesizing an image, and an image reduction circuit for reducing an image in size.

3. An image processor claimed in claim 2 further including a featured point memory circuit for storing the featured point of the image detected by the feature recognition circuit.

4. An automated optical inspection system comprising:
an image input means for optically sensing an image of an object to be inspected so as to generate an image data; and
an image processor including an image memory circuit receiving the image data outputted from the image input means for storing a received image data, an image processing circuit means for processing the image data stored in the image memory circuit, the image processing circuit means including a plurality of image processing circuits being formed for respectively performing predetermined processing functions different from each other, and an image distributing circuit including control means for establishing and controlling connections between the plurality of image processing circuits and the image memory circuit for selectively and arbitrarily coupling predetermined image processing circuits to said image memory circuit and causing said image processing circuits to operate and perform different processing functions in parallel so that a flow of data transferred and processed through said image processing circuits can be arbitrarily changed by said control means.

5. An automated optical inspection system claimed in claim 4 wherein the plurality of image processing circuits are constituted of at least two circuits selected from the group consisting of a pattern width measuring circuit for measuring a pattern width and a space between adjacent patterns, a thinning/thickening processing circuit for thinning or thickening the width of a pattern, a thinning processing circuit for thinning a pattern into a predetermined constant width, a feature recognition circuit for detecting a position of a featured point of an image, an image synthesis circuit for synthesizing an image, and an image reduction circuit for reducing an image in size, and further including a featured point memory circuit for storing the featured point of the image detected by the feature recognition circuit.

6. An automated optical inspection system comprising:
an image data preparation means for preparing and outputting an image data of an object to be inspected; and
an image processor including an image memory circuit receiving the image data outputted from the image data preparation means for storing a received image data, an image processing circuit means for processing the image data stored in the image memory circuit, the image processing circuit means including a plurality of image processing circuits being formed for respectively performing predetermined processing functions different from each other, and an image distributing circuit including control circuit means for establishing and controlling connections between the plurality of image processing circuits and the image memory circuit for selectively and arbitrarily coupling predetermined image processing circuits to said image memory circuit and causing said image processing circuits to operate and perform different processing functions in parallel so that a flow of data transferred and processed through said image processing circuits can be arbitrarily changed by said control circuit means.

7. An automated optical inspection system claimed in claim 6 further including an image input means for optically sensing an image of an object to be inspected so as to generate an image data, and wherein the image memory circuit receives the image data outputted from the image input means for storing a received image data.

8. An image processor comprising an image memory circuit for storing an inputted image data; an image processing circuit means for processing the image data stored in the image memory circuit, the image processing circuit means including a plurality of image processing circuits being formed for respectively performing predetermined processing functions different from each other; and an image distributing circuit including a control circuit for establishing and controlling various connections between the plurality of image processing circuits and the image memory circuit so as to selectively and arbitrarily couple predetermined image processing circuits to said image memory circuit and cause said image processing circuits to operate and perform different processing functions in parallel, a data distributing circuit connected to said image processing circuits and to said control circuits for selecting predetermined image processing circuits and supplying an image data to selected image processing circuits, a memory address generating circuit connected to said image memory circuit for generating a read address and a write address thereof, said control circuit setting and controlling operation of said memory address generating circuit and said data distributing circuit, and a control memory circuit connected to said control circuit for storing and supplying a control procedure thereto.

9. An image processor claimed in claim 8 wherein the plurality of image processing circuits are constituted of at least two circuits selected from the group consisting of a pattern width measuring circuit for measuring a pattern width and a space between adjacent patterns, a thinning/thickening processing circuit for thinning or thickening the width of a pattern, a thinning processing circuit for thinning a pattern into a predetermined constant width, a feature recognition circuit for detecting a position of a featured point of an image, an image synthesis circuit for synthesizing an image, and an image reduction circuit for reducing an image in size.

10. An image processor claimed in claim 9, and further comprising a featured point memory circuit for storing the featured point of the image detected by the feature recognition circuit.

11. An automated optical inspection system comprising:
   an image input data for optically sensing an image of an object to be inspected so as to generate an image data; and
   an image processor including an image memory circuit receiving the image data outputted from the image input means for storing a received image data, an image processing circuit means for processing the image data stored in the image memory circuit, the image processing circuit means including a plurality of image processing circuits being formed for respectively performing predetermined processing functions different from each other, and an image distributing circuit including a control circuit for establishing and controlling connections between the plurality of image processing circuits and the image memory circuit so as to selectively and arbitrarily couple predetermined image processing circuits to said image memory circuit and cause said image processing circuits to operate and perform different processing functions in parallel, a data distributing circuit connected to said image processing circuits and to said control circuit for selecting predetermined image processing circuits and supplying an image data to selected image processing circuits, a memory address generating circuit connected to said image memory circuit for generating a read address and a write address thereof, said control circuit setting and controlling operation of said memory address generating circuit and said data distributing circuit, and a control memory circuit connected to said control circuit for storing and supplying a control procedure thereto.

12. An automated optical inspection system claimed in claim 11, wherein the plurality of image processing circuits are constituted of at least two circuits selected from the group consisting of a pattern width measuring circuit for measuring a pattern width and a space between adjacent patterns, a thinning/thickening processing circuit for thinning or thickening the width of a pattern, a thinning processing circuit for thinning a pattern into a predetermined constant width, a feature recognition circuit for detecting a position of a featured point of an image, an image synthesis circuit for synthesizing an image, and an image reduction circuit for reducing an image in size, and further including a featured point memory circuit for storing the featured point of the image detected by the feature recognition circuit.

* * * * *